US008090052B2

(12) United States Patent
Elmala et al.

(10) Patent No.: US 8,090,052 B2
(45) Date of Patent: Jan. 3, 2012

(54) SYSTEMS AND METHODS FOR DIGITAL DELAYED ARRAY TRANSMITTER ARCHITECTURE WITH BEAM STEERING CAPABILITY FOR HIGH DATA RATE

(75) Inventors: Mostafa Elmala, Tigard, OR (US); Ashoke Ravi, Hillsboro, OR (US); Nader Rohani, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 1040 days.

(21) Appl. No.: 11/729,588

(22) Filed: Mar. 29, 2007

(65) Prior Publication Data

US 2008/0240170 A1 Oct. 2, 2008

(51) Int. Cl.
*H04L 27/00* (2006.01)

(52) U.S. Cl. .......................................................... 375/299

(58) Field of Classification Search .................. 375/299, 375/295, 296, 315
See application file for complete search history.

(56) References Cited

U.S. PATENT DOCUMENTS 5,861,845 A * 1/1999 Lee et al. ...................... 342/375
5,943,010 A * 8/1999 Rudish et al. .................. 342/372
6,529,162 B2 * 3/2003 Newberg et al. .............. 342/375
6,549,151 B1 * 4/2003 Kober et al. .................. 341/141
6,778,137 B2 * 8/2004 Krikorian et al. ............. 342/372
6,914,492 B2 * 7/2005 Hui et al. ........................ 331/57
7,002,418 B2 * 2/2006 Zhu et al. ........................ 331/17
7,394,424 B1 * 7/2008 Jelinek et al. ................. 342/375
7,450,657 B2 * 11/2008 Paulraj et al. ................. 375/267
2002/0013133 A1 * 1/2002 Lam .............................. 455/137
2002/0109629 A1 * 8/2002 Hieb ............................. 342/367
2002/0175859 A1 * 11/2002 Newberg et al. .............. 342/375
2004/0062469 A1 * 4/2004 Ionov .............................. 385/15
2007/0147543 A1 * 6/2007 Horng et al. .................. 375/299
2007/0171811 A1 * 7/2007 Lee et al. ...................... 370/208
2007/0194986 A1 * 8/2007 Dulmovits et al. ........... 342/371
2009/0005120 A1 * 1/2009 Ylitalo ....................... 455/562.1

* cited by examiner

*Primary Examiner* — Jaison Joseph
(74) *Attorney, Agent, or Firm* — Schubert Law Group PLLC

(57) ABSTRACT

Embodiments include systems and methods for fine control of beam steering for wide band wireless applications using a phased array of antenna elements. In one embodiment, a digitally controlled delay line delays the signal output from a modulator in each branch of multiple branches feeding multiple antennas in an array. An output of the digital delay line is input to a digital to analog converter. A second digital delay line also delays the signal within the digital to analog converter. The manner of implementation of the delays enables accurate production of a steered beam at a high data rate.

20 Claims, 6 Drawing Sheets

SYSTEMS AND METHODS FOR DIGITAL DELAYED ARRAY TRANSMITTER ARCHITECTURE WITH BEAM STEERING CAPABILITY FOR HIGH DATA RATE

FIELD

The present invention is in the field of wireless communications between a host computing system and multiple endpoint devices. More particularly, the invention is in the field of management of remote pipe resources in a wireless adapter.

BACKGROUND

"Wireless computing" is a term that has come to describe wireless communications between computing devices or between a computer and peripheral devices such as printers. For example, many computers, including tower and laptop models, have a wireless communications card that comprises a transmitter and receiver connected to an antenna. Or alternatively, a Host Wire Adapter (HWA) is connected to the computer by a USB (Universal Serial Bus) cable. The HWA has an RF (Radio Frequency) transmitter and receiver capable of communicating data in a USB-cognizable format. This enables the computer to communicate by RF transmission with a wireless network of computers and peripheral devices. The flexibility and mobility that wireless computing affords is a major reason for its commercial success.

In wireless applications where directed transmitted beam (or controlled angle of radiation) is desired, multiple-antennas can be used, together with delay elements or phase shifters in multiple TX paths, to form the required beam. Phase-shifting the local oscillator (LO) signal between multiple TX paths or Cartesian combining of multiple TX paths has been used in implementing phased-array systems, with the limitation of narrow-band operation. However, when the data rate is high, the error vector magnitude (EVM) increases.

BRIEF DESCRIPTION OF THE DRAWINGS

Aspects of the invention will become apparent upon reading the following detailed description and upon reference to the accompanying drawings in which like references may indicate similar elements.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Embodiments include systems and methods for fine control of beam steering for wide band wireless applications using a phased array of antenna elements. In one embodiment, a digitally controlled delay line delays the signal output from a modulator in each branch of multiple branches feeding multiple antennas in an array. An output of the digital delay line is input to a digital to analog converter. A second digital delay line also delays the signal within the digital to analog converter. The manner of implementation of the delays enables accurate production of a steered beam at a high data rate.

The wireless communication systems described herein are intended to represent any of a wide variety of wireless systems which may include without limitation, NFC (Near Field Communications), WPAN (Wireless Personal Area Network), WLAN (Wireless Local Area Network), WMAN (Wireless Metropolitan Area Network), WiMAX (Worldwide Interoperability for Microwave Access), 2.5-3G (Generation) cellular, 3G RAN (Radio Access Network), 4G, RFID (Radio Frequency Identification), etc.

Figure 1:
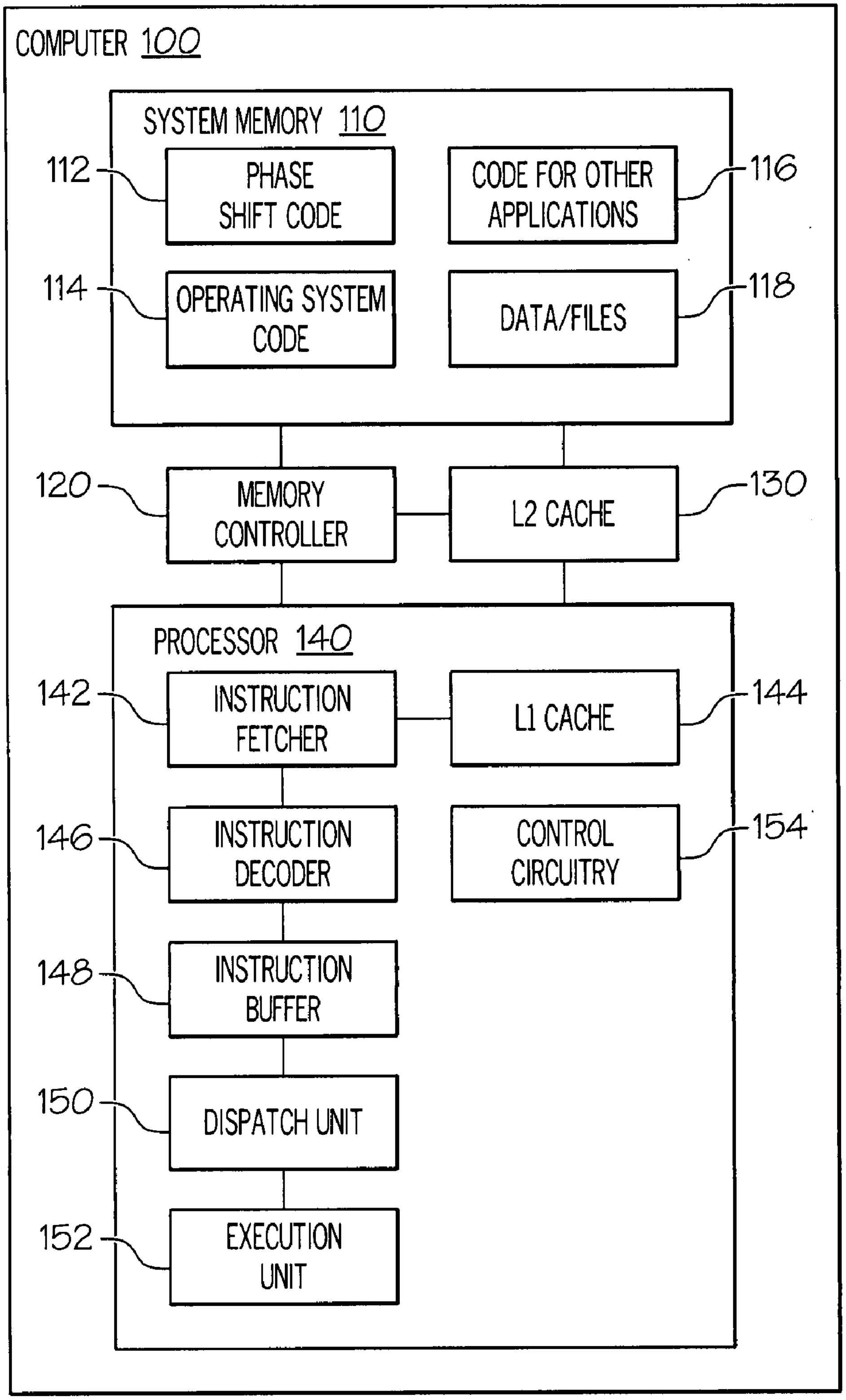
FIG. 1 depicts an embodiment of a computer to control aperture control shutters and to communicate with peripheral devices.

FIG. 1 shows a view of a computer 100 of a host system to communicate with wireless devices. Computer 100 comprises a system memory 110, a memory controller 120, an L2 cache 130, and a processor 140. System memory 110 comprises a hard disk drive memory, Read-Only Memory (ROM), and Random Access Memory (RAM). System memory 110 stores antenna phase shift control code 112, Operating System (OS) code 114, Basic Input-Output System (BIOS) code (not shown), and code for other application programs 116. System memory 110 also stores data and files 118. The antenna phase shift control code 112, OS code 114, and applications code 116, are typically stored on a hard drive, whereas BIOS code is typically stored in ROM.

Memory controller 120 effectuates transfers of instructions and data from system memory 110 to L2 cache 130 and from L2 cache 130 to an L1 cache 144 of processor 140. Thus, data and instructions are transferred from a hard drive to L2 cache near the time when they will be needed for execution in processor 140. L2 cache 130 is fast memory located physically close to processor 140. Instructions may include load and store instructions, branch instructions, arithmetic logic instructions, floating point instructions, etc. L1 cache 144 is located in processor 140 and contains data and instructions received from L2 cache 130. Ideally, as the time approaches for a program instruction to be executed, the instruction is passed with its data, if any, first to the L2 cache, and then as execution time is near imminent, to the L1 cache.

In addition to on-chip level 1 cache 144, processor 140 also comprises an instruction fetcher 142, instruction decoder 146, instruction buffer 148, a dispatch unit 150, execution units 152 and control circuitry 154. Instruction fetcher 142 fetches instructions from memory. Instruction fetcher 142 maintains a program counter and fetches instructions from L1 cache 130. The program counter of instruction fetcher 142 comprises an address of a next instruction to be executed. Instruction fetcher 142 also performs pre-fetch operations. Thus, instruction fetcher 142 communicates with a memory controller 214 to initiate a transfer of instructions from the system memory 110, to instruction cache L2 130, and to L1 instruction cache 144. The place in the cache to where an instruction is transferred from system memory 110 is determined by an index obtained from the system memory address.

Instruction fetcher 142 retrieves instructions passed to instruction cache 144 and passes them to an instruction decoder 146. Instruction decoder 146 receives and decodes the instructions fetched by instruction fetcher 142. An instruction buffer 148 receives the decoded instructions from instruction decoder 146. Instruction buffer 148 comprises memory locations for a plurality of instructions. Instruction buffer 148 may reorder the order of execution of instructions received from instruction decoder 146. Instruction buffer 148 therefore comprises an instruction queue to provide an order in which instructions are sent to a dispatch unit 150.

Dispatch unit 150 dispatches instructions received from instruction buffer 148 to execution units 152. In a superscalar architecture, execution units 152 may comprise load/store units, integer Arithmetic/Logic Units, floating point Arithmetic/Logic Units, and Graphical Logic Units, all operating in parallel. Dispatch unit 150 therefore dispatches instructions to some or all of the executions units to execute the instructions simultaneously. Execution units 152 comprise stages to perform steps in the execution of instructions received from dispatch unit 150. Data processed by execution units 152 are storable in and accessible from integer register files and floating point register files not shown. Thus, instructions are executed sequentially and in parallel.

FIG. 1 also shows control circuitry 154 to perform a variety of functions that control the operation of processor 100. For example, an operation controller within control circuitry 154 interprets the OPCode contained in an instruction and directs the appropriate execution unit to perform the indicated operation. Also, control circuitry 154 may comprise a branch redirect unit to redirect instruction fetcher 142 when a branch is determined to have been mispredicted. Control circuitry 154 may further comprise a flush controller to flush instructions younger than a mispredicted branch instruction. Computer 100 further comprises other components and systems not shown in FIG. 1, including, RAM, peripheral drivers, a system monitor, a keyboard, flexible diskette drives, removable non-volatile media drives, CD and DVD drives, a pointing device such as a mouse, etc. Computer 100 may be a personal computer, a workstation, a server, a mainframe computer, a notebook or laptop computer, etc.

Figure 2:
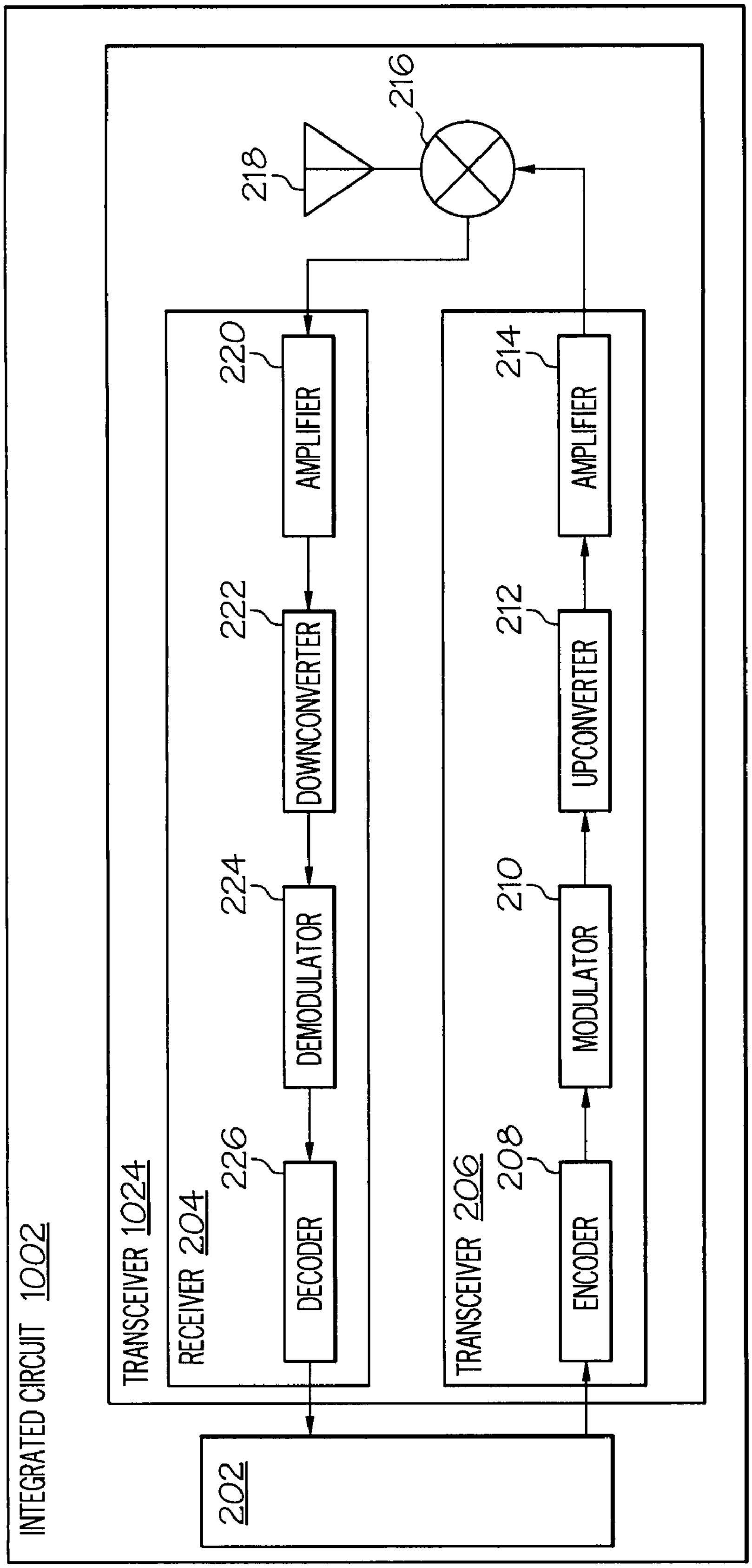
FIG. 2 depicts a transceiver in a computer-based communications system.

FIG. 2 shows an embodiment of an integrated circuit 1002 comprising a transceiver unit 1024 as may be found in a wireless computing system. Transceiver 1024 comprises a receiver 204 and a transmitter 206. An embodiment of a transmitter comprises an encoder 208, a modulator 210, an upconverter 212, and an amplification, stage 214. An embodiment of a receiver comprises an amplification stage 220, a downconverter 222, a demodulator 224 and a decoder 226. Each of these components of transceiver 1024 and their functions will now be described.

Encoder 208 of transmitter 206 receives data destined for transmission from a core 202. Core 202 may comprise a computing system such as described with reference to FIG. 1. Core 202 presents data to transceiver 1024 in blocks such as bytes of data and receives data from transceiver 1024. Encoder 208 encodes the data and may introduce redundancy to the data stream. Encoding may be done to achieve one or more of a plurality of different purposes. For example, coding may be performed to decrease the average number of bits that must be sent to transfer each symbol of information to be transmitted. Coding may be performed to decrease a probability of error in symbol detection at the receiver. Thus, an encoder may introduce redundancy to the data stream. Adding redundancy increases the channel bandwidth required to transmit the information, but results in less error, and enables the signal to be transmitted at lower power. Adding redundancy increases the channel bandwidth required to transmit the information, but results in less error, and enables the signal to be transmitted at lower power. Encryption may also be performed for security.

One type of encoding is block encoding. In block encoding, the encoder encodes a block of k information bits into corresponding blocks of n code bits, where n is greater than k. Each block of n bits from the encoder constitutes a code word in a set of $N=2^k$ possible code words. An example of a block encoder that can be implemented is a Reed-Solomon encoder, known by those skilled in the art of encoding. Another type of encoding is linear convolutional encoding. The convolutional encoder may be viewed as a linear finite-state shift register with an output sequence comprising a set of linear combinations of the input sequence. The number of output bits from the shift register for each input bit is a measure of the redundancy in the code. Thus, different embodiments may implement different encoding algorithms.

Modulator 210 of transmitter 206 receives data from encoder 208. A purpose of modulator 210 is to transform each block of binary data received from encoder 208 into a unique continuous-time waveform that can be transmitted by an antenna upon upconversion and amplification. The modulator impresses the received data blocks onto a sinusoid of a selected frequency. The output of the modulator is a band pass signal that is upconverted to a transmission frequency, amplified, and delivered to an antenna.

In one embodiment, modulator 210 maps a sequence of binary digits into a set of discrete amplitudes of a carrier frequency. This is called Pulse Amplitude Modulation (PAM). Quadrature Amplitude Modulation (QAM) is attained by impressing two separate k-bit symbols from the information sequence onto two quadrature frequencies, cos $(2\pi ft)$ and $\sin(2\pi ft)$.

In another embodiment, modulator 210 maps the blocks of data received from encoder 208 into a set of discrete phases of the carrier to produce a Phase-Shift Keyed (PSK) signal. An N-phase PSK signal is generated by mapping blocks of $k=\log_2 N$ binary digits of an input sequence into one of N corresponding phases $\theta=2\pi(n-1)$ in for n a positive integer less than or equal to N. A resulting equivalent low pass signal may be represented as $$u(t) = \sum_{n=0}^{\infty} e^{j\theta_n} g(t - nT)$$

where g(t−nT) is a basic pulse whose shape may be optimized to increase the probability of accurate detection at a receiver by, for example, reducing inter-symbol interference. Inter-symbol interference results when the channel distorts the pulses. When this occurs adjacent pulses are smeared to the point that individual pulses are difficult to distinguish. A pulse shape may therefore be selected to reduce the probability of symbol misdetection due to inter-symbol interference.

In yet another embodiment, modulator 210 maps the blocks of data from an information sequence received from encoder 208 into a set of discrete frequency shifts to produce a Frequency-Shift-Keyed (FSK) signal. A resulting equivalent low pass signal may be represented as:

$$u(t) = \sum_{n=0}^{\infty} \exp(j\pi\Delta ftI_n)g(t - nT)$$

where $I_n$ is an odd integer up to N−1 and Δf is a unit of frequency shift. Thus, in an FSK signal, each symbol of an information sequence is mapped into one of N frequency shifts.

Persons of skill in the art will recognize that the mathematical equations discussed herein are illustrative, and that different mathematical forms may be used to represent the pertinent signals. Also, other forms of modulation that may be implemented in modulator 210 are known in the art.

The output of modulator 210 is fed to upconverter 212. A purpose of upconverter 212 is to shift the modulated waveform received from modulator 210 to a much higher frequency. Shifting the signal to a much higher frequency before transmission enables use of an antenna of practical dimensions. That is, the higher the transmission frequency, the smaller the antenna can be. Thus, an up-converter multiplies the modulated waveform by a sinusoid to obtain a signal with a carrier frequency that is the sum of the central frequency of the waveform and the frequency of the sinusoid. The operation is based on the trigonometric identity:

$$\sin A\cos B = \frac{1}{2}[\sin(A+B)+\sin(A-B)]$$

The signal at the sum frequency (A+B) is passed and the signal at the difference frequency (A−B) is filtered out. Thus, a band pass filter is provided to ideally filter out all but the information to be transmitted, centered at the carrier (sum) frequency.

The required bandwidth of the transmitted signal depends upon the method of modulation. A bandwidth of about 10% is exemplary. The encoded, modulated, upconverted, filtered signal is passed to amplifier 214. In an embodiment, amplifier 214 provides high power amplification to drive the antenna 218. However, the power does not need to be very high to be received by receivers in close proximity to transmitter 206. Thus, one may implement a transmitter of moderate or low power output capacity. The required RF transmitter power to effectuate communications within the distances between transceiver units and an endpoint device may be varied.

FIG. 2 also shows diplexers 216 connected to antenna system 218. The antenna system comprises an array of antenna elements for transmitting highly directive antenna beams. When transmitting, the signal from amplifier 214 passes through diplexer 216 and drives the antenna with the upconverted information-bearing signal. The diplexer prevents the signal from amplifier 214 from entering receiver 204. When receiving, an information bearing signal received by the antenna passes through diplexer 216 to deliver the signal from the antenna to receiver 204. The diplexer then prevents the received signal from entering transmitter 206. In another embodiment, separate antennas may be used for transmit and receive and a diplexer is not needed. A transmit antenna 218 radiates the information bearing signal into a time-varying, spatial distribution of electromagnetic energy that can be received by an antenna of a receiver.

FIG. 2 also shows an embodiment of a receiver 204 for receiving, demodulating, and decoding an information bearing signal. The signal is fed from antenna 218 to a low noise amplifier 220. Amplifier 220 comprises filter circuitry which passes the desired signal information and filters out noise and unwanted signals at frequencies outside the pass band of the filter circuitry. A downconverter 222 downconverts the signal at the carrier frequency to an intermediate frequency or to base band. By shifting the received signal to a lower frequency or to baseband, the function of demodulation is easier to perform. Demodulator 224 demodulates the received signal to extract the information content from the received down converted signal to produce an information signal. Decoder 226 decodes the information signal received from demodulator 224 and transmits the decoded information to core 202. Persons of skill in the art will recognize that a transceiver will comprise numerous additional components not shown in FIG. 2. Note that each endpoint device has its own transceiver which operates substantially as described above.

Figure 3:
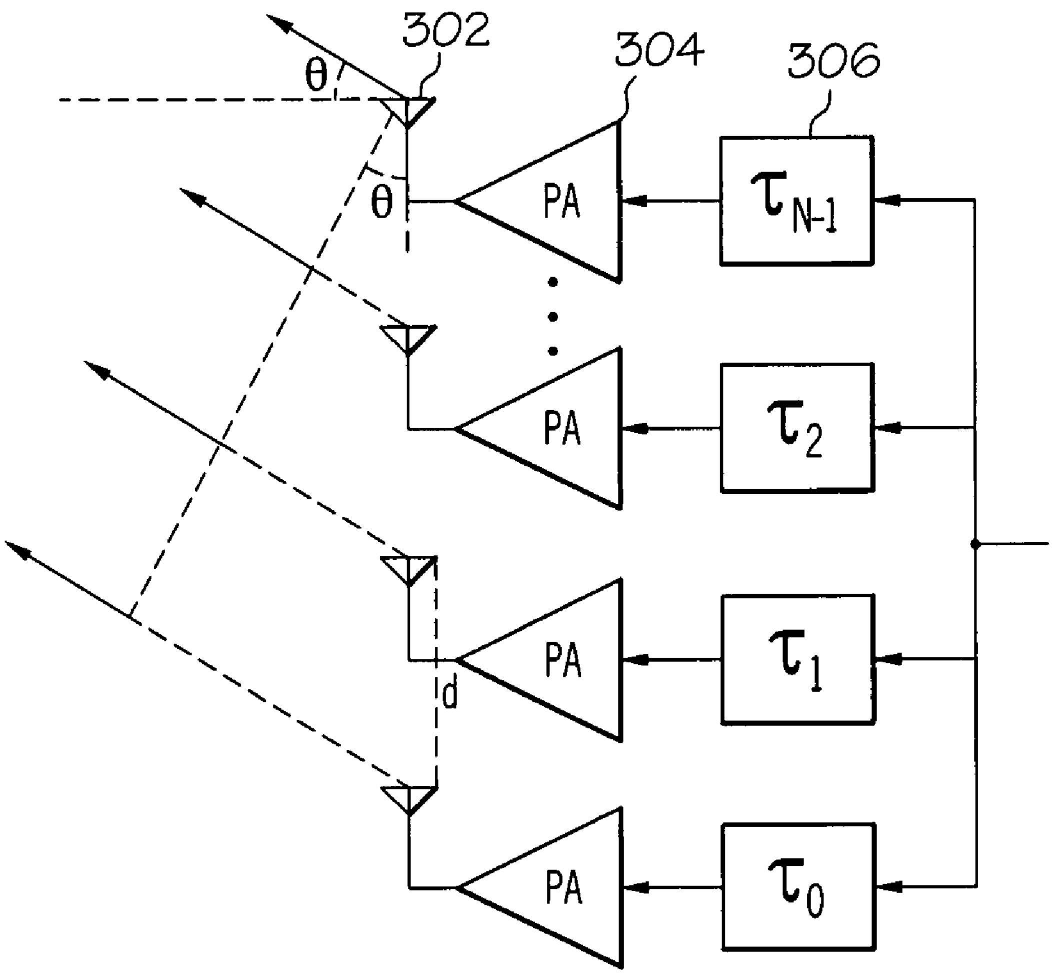
FIG. 3 depicts a phased array architecture.

A more detailed description of embodiments of proposed antenna systems is now provided. A delayed-array system consists of several signal paths connected to separate antennas as shown in FIG. 3. Each antenna element 302 of an antenna array receives a signal from a power amplifier 304. The signal input to a power amplifier is delayed by a delay element 306. This system of FIG. 3 can imitate a directional antenna, with digitally controlled angle of radiation. The amount of delay in each signal path determines the direction in which the signals add constructively (coherent addition), achieving maximum composite radiated power. In other directions, the signals add destructively (incoherent addition), resulting in lower composite radiated power in these directions. For n paths, the total directed power equals $n^2P_s$, where $P_s$ is the power radiated by one path.

By defining angle of radiation θ, distance between antennas d, delay between two adjacent antennas τ, speed of light c, operating frequency $\omega_0$, and wavelength $\lambda_0$; then we can calculate τ as:

$$\tau = \frac{d\sin(\theta)}{c} = \frac{2\pi d\sin(\theta)}{\lambda_0\omega_0}$$

Therefore, the delay from the m-th antenna equals mτ. If we add a delay in the m-th signal path of −mτ; then all the radiated signals will add constructively. This is equivalent to adding zero delay in the longest path and nτ delay in the shortest path (where n is the total number of paths). This can be written as a function of the input signal $S_{in}(t)$ as:

$$S(t) = \sum_m S_{in}(t) = nS_{in}(t)$$

For a modulated signal $S_{in}(t)$, the delay in each path will affect both amplitude and phase modulation. If the amplitude and phase modulation are represented as A(t) and ϕ(t), then:

$$S_{in}(t)=A(t)\exp(j(\omega_0 t+\phi(t)))$$

is the input signal and $$S_{in}(t-m\tau)=A(t-m\tau)\exp(j(\omega_0 t-m\omega_0\tau+\phi(t-m\tau)))$$

is delayed signal in one path. For narrow-band modulated signal, the amplitude and phase modulation are varying slowly relative to the carrier frequency, and therefore this delayed signal can be approximated by:

$$S_{in}(t-m\tau)\approx A(t)\exp(j(\omega_0 t-m\omega_0\tau+\phi(t)))=S_{in}(t)\exp(-jm\omega_0\tau)$$

This last equation shows that the delay in each path can be approximated by a phase shift which is valid only for narrow-band signals. So, there are two ways of approaching design of the system architecture:

a) One for narrow-band signaling by using Cartesian signal representation and combining or dealing with phase shifts in each path, e.g., multiple LO (local oscillator) phase shift techniques found in the literature which are used in implementing phased-array RX (receive) and TX (transmit) systems using a complex LO "bus" with beam steering accuracy being a function of the number of LO phases.

b) The other is more general and suitable for wide-band applications (in which case one must contend with time delays in each path).

Figure 4:
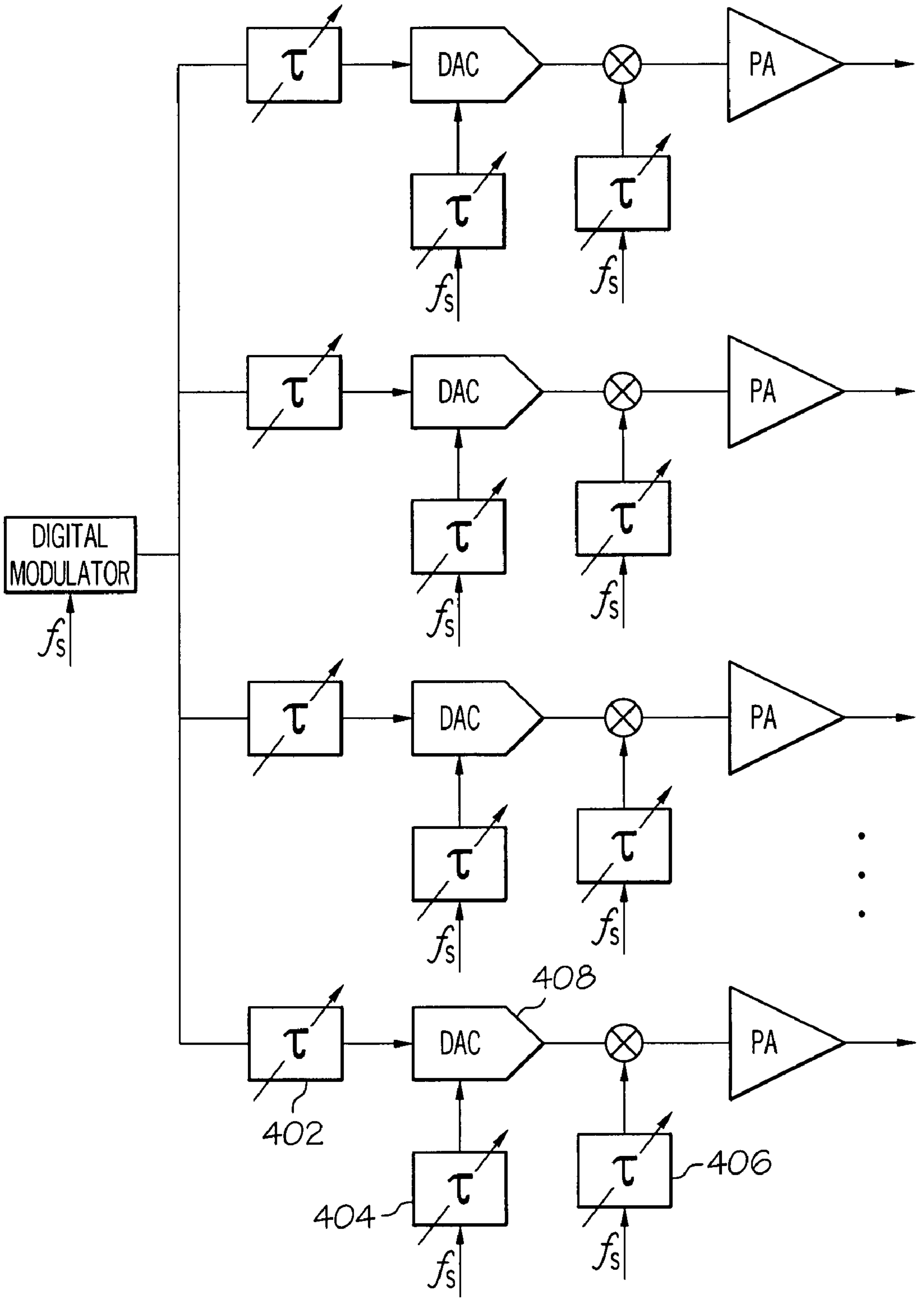
FIG. 4 depicts an embodiment of a digitally delayed transmit (TX) architecture.

Accordingly, the present application discloses a digital-based architecture to implement delayed-array TX to handle wide-band (high data rate) signals. In some embodiments, inverter delay is used as a basis for implementing the needed delay units in different TX paths. FIG. 4 shows a diagram of a proposed architecture, showing the added programmable variable delay elements 402, 404, and 406. This architecture implements the broad band gain equation:

$$G(\theta) = \frac{\sin^2\left(\pi n \frac{d}{\lambda_0}(\sin(\theta) - \sin(\phi))\right)}{n^2 \sin^2\left(\pi \frac{d}{\lambda_0}(\sin(\theta) - \sin(\phi))\right)}$$

Since the delay is based on using inverters, delay must be added in the LO and the digital part of the TX. In this architecture, the signal is converted to analog form in the semi-digital DAC/Filter block 408. The programmable delay elements 404 and 402 are added at the input of the DAC and in the LO path, where there is no amplitude information. In this way, one can avoid inserting the inverter-based delays at the output of the DAC where the signal is in analog form and has amplitude variations.

Figure 5:
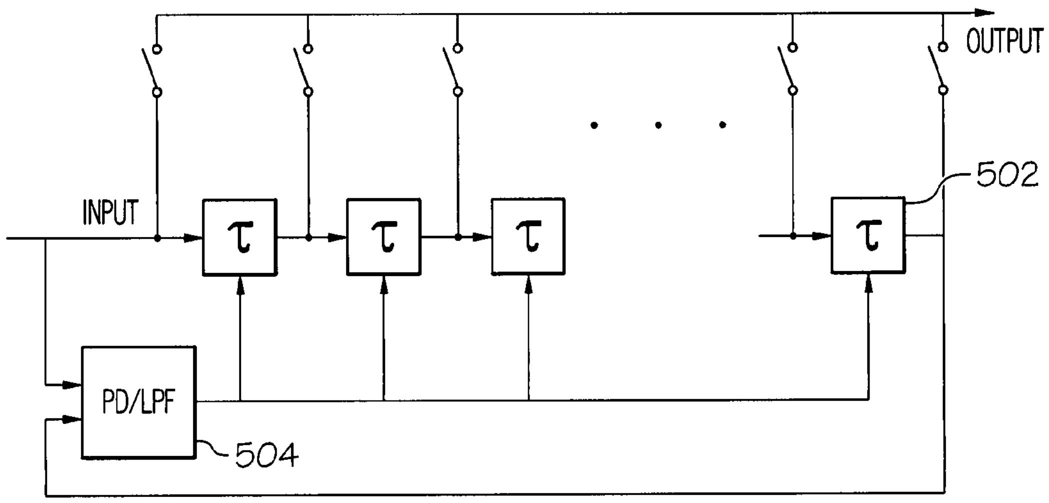
FIG. 5 depicts an embodiment of delay locked loop digital delay architecture.

An implementation of a digitally programmable delay block is shown in FIG. 5. The minimum delay "τ", 502, is large if implemented as a flip-flop (which corresponds to a minimum of one clock cycle=250 ps (pico-seconds) @ a 4 GHz CLK). However, the delay has to be on the order of an inverter delay (10 ps to 20 ps), to give an acceptable beam steering resolution. This delay can be stabilized through a delay-locked loop (DLL) to compensate for process and temperature variations. FIG. 5 shows a simple DLL with a phase-detector (PD) and a low-pass filter (LPF) 504 to adjust the delay of each inverter 502. If fine beam steering is required, then fine delay is required which can be achieved by using a delay vernier technique.

Thus, some embodiments include a system for beam steering in a wide band wireless system. Embodiments comprise a modulator to output an information bearing digital signal, to a plurality of branches, each branch leading to an antenna in array of antennas. The system comprises a controllable delay line of inverters to controllably delay the digital signal received from the modulator and passing the signal to a digital to analog converter. The system further comprises a controllable delay line of inverters to delay the digital signal processed by the digital to analog converter to achieve beam steering with substantially small error when transmitting a wide band signal. The system may further comprise delay circuitry to delay an analog signal output by the digital to analog converter. In some embodiments, a controllable delay line comprises a delay locked loop. The delay implemented by an inverter may be on the order of tens of pico-seconds. In some embodiments a controllable delay is implemented by programmable control of a number of inverters in the delay line.

Figure 6:
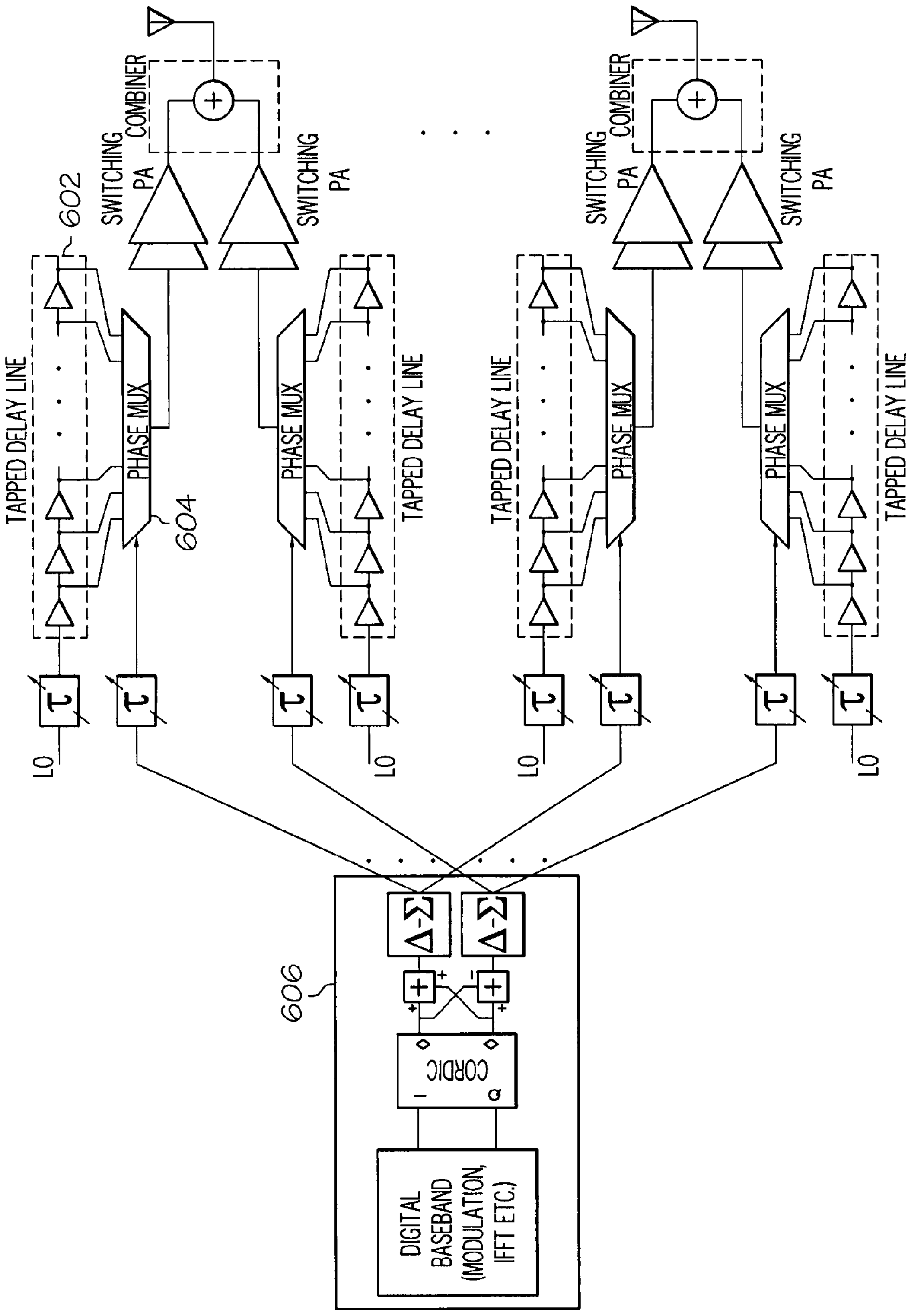
FIG. 6 depicts an embodiment of digital delay based TX architecture.

FIG. 6 shows another embodiment. A clock source (at the desired RF frequency) drives tapped digital delay lines 602. Each delay line consists of unit elements whose intrinsic delay is much smaller than one clock period and synthesizes multiple phases of the input clock waveform. One phase from each delay line is selected by a multiplexer 604. The selection control for the delay lines are driven by a block that digitally decomposes the desired baseband signal into the outphasing components. Since each delay line only consists of discrete phases, a sigma-delta modulator 606 that dithers between these discrete values can be used to realize a finer average phase. The programmable delay elements for beam-steering are added to the multiple transmit paths.

Embodiments enable beam steering for wide band signals in wireless applications where antenna gain is directed toward a controllable angle of radiation. The EVM (Error Vector Magnitude) is small compared to traditional phased array systems that are based on narrow band approximations. Embodiments provide for reconfiguration for multi-mode operation, scalability, smaller die area, lower power consumption, with less sensitivity to process and temperature. The techniques described herein facilitate the integration of small CMOS PA (Power Amplifier) modules into the RFIC (Radio Frequency Integrated Circuit). PA integration in advanced CMOS processes becomes more reliable as each PA module can use lower supply voltage and avoids problems of break-down and hot-carrier effects. The technique is based on digital electronic control for steering the beam or radiation angle. This is more accurate than traditional phased-array systems, which heavily depend on accuracy and matching in the integrated circuit chip layout. The used of a DLL (Delay Locked Loop) stabilizes the controllable unit delay, which makes beam steering more accurate. A TX designed according to the methods described herein can be used both for MIMO (Multiple Input Multiple Output) or beam steering, so there is no need to use separate antennas for beam steering in a MIMO system. Rather, the system can be used for both techniques simultaneously if more antennas are used. The techniques can also be used for interference cancellation as the output radiated power is minimized in other directions different than the selected beam steered angle.

The present invention and some of its advantages have been described in detail for some embodiments. It should be understood that various changes, substitutions and alterations can be made herein without departing from the spirit and scope of the invention as defined by the appended claims. An embodiment of the invention may achieve multiple objectives, but not every embodiment falling within the scope of the attached claims will achieve every objective. Moreover, the scope of the present application is not intended to be limited to the particular embodiments of the process, machine, manufacture, composition of matter, means, methods and steps described in the specification. One of ordinary skill in the art will readily appreciate from the disclosure of the present invention that processes, machines, manufacture, compositions of matter, means, methods, or steps, presently existing or later to be developed are equivalent to, and fall within the scope of, what is claimed. Accordingly, the appended claims are intended to include within their scope such processes, machines, manufacture, compositions of matter, means, methods, or steps.

What is claimed is:

1. A method for beam steering in a wide band wireless system, comprising:

distributing a digital signal from a modulator to each of a plurality of branches, each branch leading to an antenna in array of antennas;

controllably delaying by inverters the digital signal received from a modulator;

passing the signal to a digital to analog converter; controllably delaying by inverters a digital signal processed by the digital to analog converter to achieve beam steering of a wide band signal; and delaying, via a variable delay element, an analog signal output by the digital to analog converter.

2. The method of claim 1, wherein delaying, via a variable delay element, an analog signal output by the digital to analog converter comprises delaying the analog signal output by the digital to analog converter with a programmable variable delay element.

3. The method of claim 1, wherein delaying, via a variable delay element, an analog signal output by the digital to analog converter comprises delaying the analog signal output by the digital to analog converter with a programmable variable delay element.

4. The method of claim 1, wherein a controllable delay is implemented by programmable control of a number of inverters in a delay line.

5. The method of claim 1, wherein a delay by an inverter is on the order of tens of pico-seconds.

6. The method of claim 1, wherein a controllable delay is implemented by programmable control of a number of inverters in a delay line.

7. The method of claim 1, wherein a controllable delay is selected by a multiplexer.

8. A system for beam steering in a wide band wireless system, comprising:

a modulator to output an information bearing digital signal to a plurality of branches, each branch leading to an antenna in array of antennas;

a controllable delay line of inverters to controllably delay a digital signal received from the modulator and to pass the signal to a digital to analog converter;

a controllable delay line of inverters to delay the digital signal processed by the digital to analog converter to achieve beam steering of a wide band signal; and a variable delay element to delay an analog signal output by the digital to analog converter.

9. The system of claim 8, wherein the variable delay element comprises programmable delay circuitry to delay the analog signal output by the digital to analog converter.

10. The system of claim 8, further comprising a multiplexer for selecting an amount of delay.

11. The system of claim 8, wherein a controllable delay line comprises a delay locked loop.

12. The system of claim 11, wherein the variable delay element comprises programmable delay circuitry to delay the analog signal output by the digital to analog converter.

13. The system of claim 11, wherein a controllable delay line is implemented by programmable control of a number of inverters in the delay line.

14. The system of claim 8, wherein a delay by an inverter is on the order of tens of pico-seconds.

15. The system of claim 8, wherein a controllable delay is implemented by programmable control of a number of inverters in the delay line.

16. A system for beam steering in a wide band wireless system, comprising:

a modulator to output an information bearing digital signal to a plurality of branches, each branch leading to an antenna in array of antennas;

a controllable delay line of inverters to controllably delay a digital signal received from the modulator and to pass the signal to a digital to analog converter (modulator line); and a controllable delay line of inverters to delay the digital signal processed by the digital to analog converter (DAC line) to achieve beam steering of a wide band signal;

wherein either the modulator line or the DAC line or both comprises a delay locked loop, comprising a phase detector and a low-pass filter.

17. The system of claim 16, further comprising a programmable variable delay element to delay an analog signal output by the digital to analog converter,

18. The system of claim 16, further comprising a Multi Input Multiple Output transmission system,

19. The system of claim 16, further comprising a sigma-delta modulator to dither between discrete values of phase delay to realize a finer average phase delay.

20. The system of claim 16, wherein the delay locked loop is to compensate for process variations or temperature variations or both process variations and temperature variations.

* * * * *

UNITED STATES PATENT AND TRADEMARK OFFICE

CERTIFICATE OF CORRECTION

PATENT NO. : 8,090,052 B2
APPLICATION NO. : 11/729588
DATED : January 3, 2012
INVENTOR(S) : Mostafa Elmala et al.

It is certified that error appears in the above-identified patent and that said Letters Patent is hereby corrected as shown below:

In column 10, line 33, in claim 17, delete "converter," and insert -- converter. --, therefor.

In column 10, line 35, in claim 18, delete "system," and insert -- system. --, therefor.

Signed and Sealed this
Twenty-seventh Day of March, 2012

David J. Kappos
*Director of the United States Patent and Trademark Office*